United States Patent
Chiffot

(10) Patent No.: US 10,520,622 B2
(45) Date of Patent: Dec. 31, 2019

(54) METHOD AND APPARATUS PERFORMING SUPER-VIRTUAL SURFACE WAVE INTERFEROMETRY

(71) Applicant: CGG SERVICES SAS, Massy (FR)

(72) Inventor: Corentin Chiffot, Dijon (FR)

(73) Assignee: CGG SERVICES SAS, Massy (FR)

( * ) Notice: Subject to any disclaimer, the term of this patent is extended or adjusted under 35 U.S.C. 154(b) by 337 days.

(21) Appl. No.: 15/485,282

(22) Filed: Apr. 12, 2017

(65) Prior Publication Data
US 2017/0299744 A1 Oct. 19, 2017

Related U.S. Application Data

(60) Provisional application No. 62/321,768, filed on Apr. 13, 2016.

(51) Int. Cl.
*G01V 1/36* (2006.01)
*G01V 1/30* (2006.01)

(52) U.S. Cl.
CPC ........... *G01V 1/362* (2013.01); *G01V 1/30* (2013.01); *G01V 1/36* (2013.01); *G01V 2210/53* (2013.01); *G01V 2210/614* (2013.01); *G01V 2210/6161* (2013.01)

(58) Field of Classification Search
CPC .... G01V 1/30; G01V 1/362; G01V 2210/614; G01V 2210/6161; G01V 1/36; G01V 2210/53
See application file for complete search history.

(56) References Cited

U.S. PATENT DOCUMENTS

| | | | |
|---|---|---|---|
| 8,417,458 B2 | 4/2013 | Halliday et al. | |
| 8,441,890 B2 | 5/2013 | Halliday et al. | |
| 2007/0104028 A1* | 5/2007 | Van Manen | G01V 1/003 367/38 |
| 2011/0044132 A1 | 2/2011 | Halliday et al. | |
| 2016/0377751 A1* | 12/2016 | De Meersman | G01V 1/284 702/16 |

FOREIGN PATENT DOCUMENTS

WO 2015078842 A1 6/2015

OTHER PUBLICATIONS

Pawan Bharadwaj et al., "Super-virtual Refraction Interferometry: Theory", SEG San Antonio 2011 Annual Meeting, Sep. 18-23, 2011, pp. 3809-3813.
Andrew J. Deighan et al., "Ground-roll suppression using the wavelet transform", Geophysics, Nov.-Dec. 1997, pp. 1896-1903, vol. 62, No. 6.
Shuqian Dong et al., "Interferometric Prediction and Least Squares Subtraction of Surface Waves", SEG/New Orleans 2006 Annual Meeting, Oct. 1-6, 2006, pp. 2783-2786.

(Continued)

*Primary Examiner* — Elias Desta
(74) *Attorney, Agent, or Firm* — Patent Portfolio Builders PLLC

(57) ABSTRACT

A method for estimating surface waves generates incident, back-scattered, virtual back-scattered and super-virtual back-scattered traces. The stacked super-virtual back-scattered traces are an estimate of the surface waves.

20 Claims, 4 Drawing Sheets

(56) References Cited

OTHER PUBLICATIONS

Craig Duguid et al., "Source-receiver interferometry for seismic wavefield construction and ground-roll removal", The Leading Edge, Aug. 2011, pp. 838-843.
Fabian Ernst et al., "Reduction of near-surface scattering effects in seismic data", The Leading Edge, Jun. 1998, pp. 759-764.
Bowen Guo et al., "Super-virtual Interferometric Separation and Enhancement of Back-scattered Surface Waves", SEG New Orleans 2015 Annual Meeting, Oct. 18-23, 2015, pp. 5092-5096.
David F. Halliday et al., "Interferometric ground-roll removal: Attenuation of scattered surface waves in single-sensor data", Geophysics, Mar.-Apr. 2010, pp. SA15-SA25, vol. 75, No. 2.
David Halliday et al., "Scattered ground-roll attenuation using model-driven interferometry", Geophysical Prospecting, 2014, pp. 1-17.
Abdullatif A. Al-Shuhail, "Improving automatic first-arrival picking by supervirtual interferometry: examples from Saudi Arabia," Arabian Journal of Geosciences, Feb. 4, 2015, vol. 8, No. 10, pp. 8731-8740.
Extended European Search Report received in corresponding EP Application No. 17305423.0-1559, dated Jul. 25, 2017.

\* cited by examiner

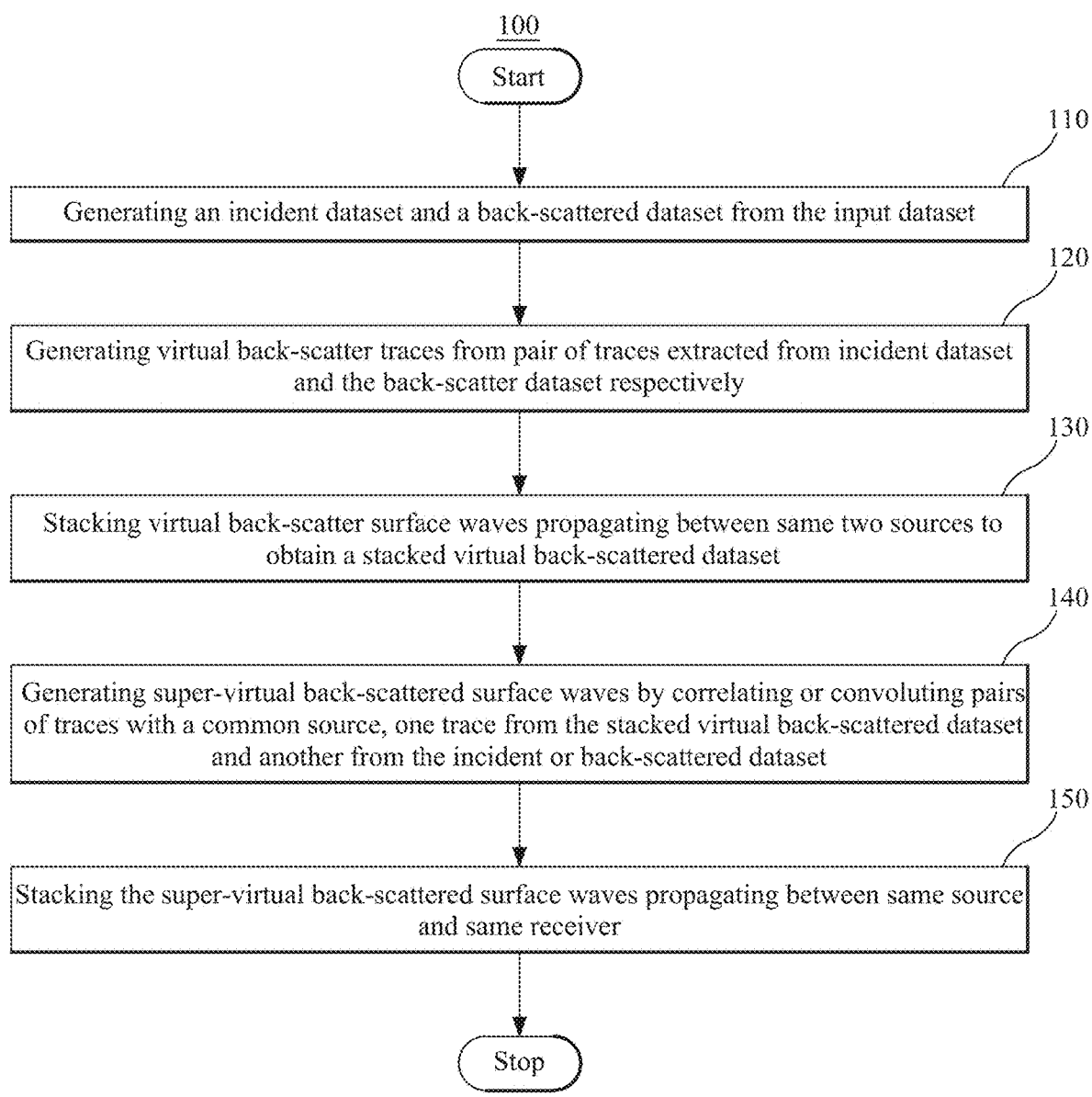

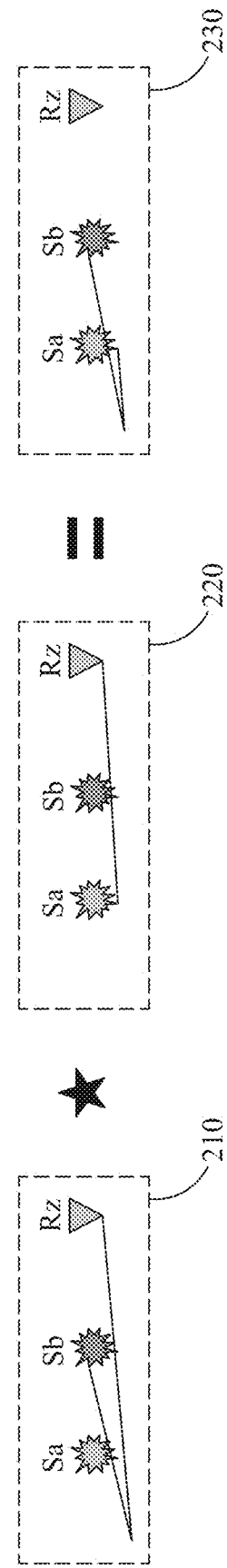
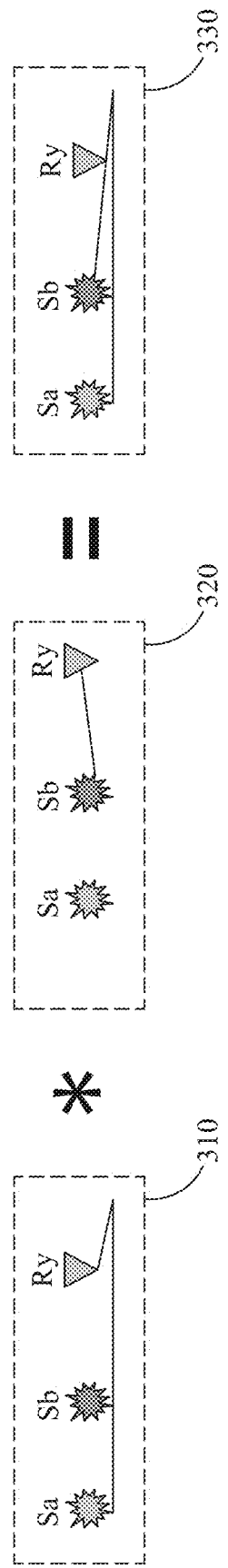

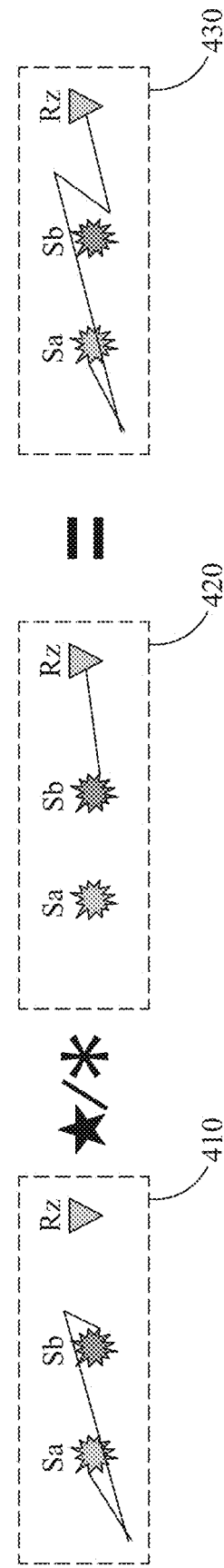
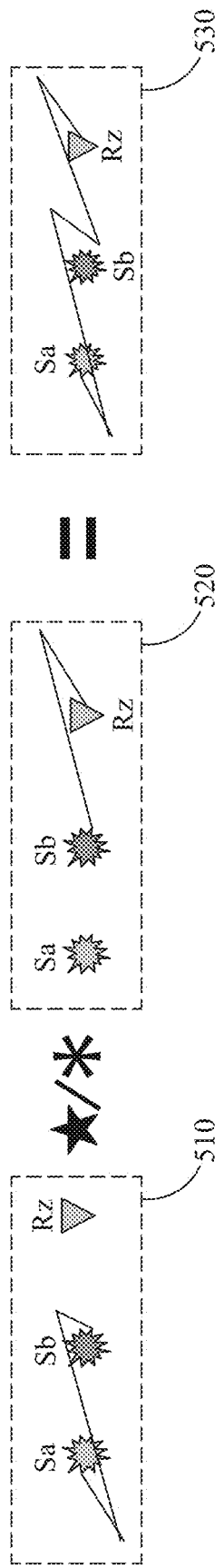

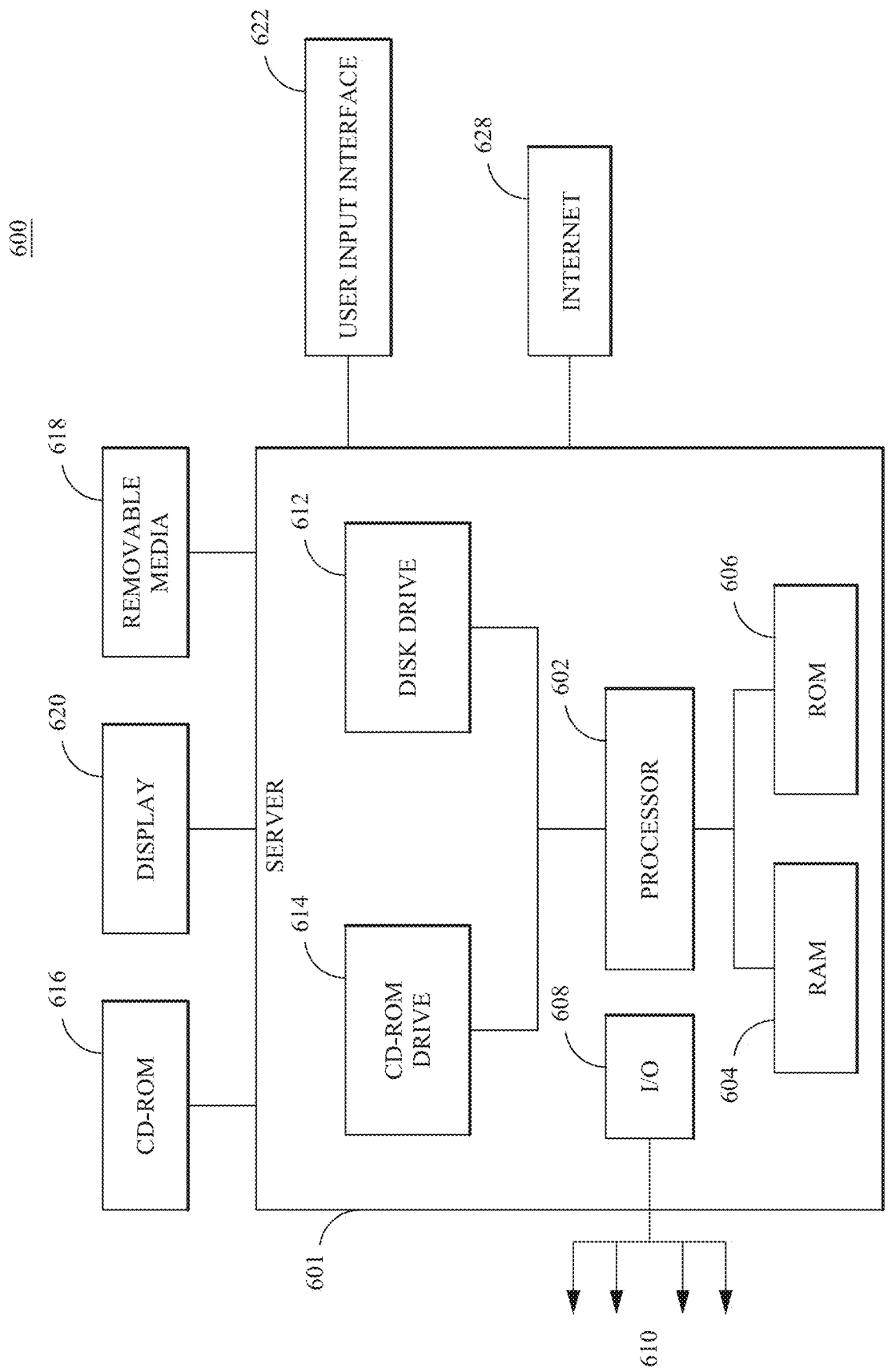

METHOD AND APPARATUS PERFORMING SUPER-VIRTUAL SURFACE WAVE INTERFEROMETRY

CROSS-REFERENCE TO RELATED APPLICATIONS

The present application is related to and claims the benefit of priority of U.S. Provisional Application 62/321,768 filed Apr. 13, 2016, the entire contents of which is incorporated herein by reference.

BACKGROUND

Technical Field

Embodiments of the subject matter disclosed herein generally relate to methods and systems for processing seismic data acquired over an underground formation, and, in particular, to methods and systems for estimating back-scattered surface waves.

Discussion of the Background

Continually increasing worldwide demand for oil and gas drives the need to allocate more and more resources to prospecting for new hydrocarbon reservoirs. Seismic surveys are perhaps the most frequently used tool for ascertaining the location of potential oil and gas underground deposits, hydrocarbon reservoir field development, and production monitoring (time lapse). Seismic surveys are performed both offshore and onshore.

Land seismic data acquired over a complex near-surface layer contains surface waves that have been back-scattered by multiple shallow scatterers (such as buried heterogeneities). It is useful to isolate those back-scattered surface waves in order to get information about the near-surface, or to remove them from the data before processing the reflected waves.

Some techniques currently employed for estimating back-scattered surface waves are reviewed below. One technique is described in A. J. Deighanet et al.'s 1997 article entitled, "Ground-roll suppression using the wavelet transform," published in *Geophysics*, 62(6), pp. 1,896-1,903, the entire content of which is incorporated by reference. This technique converts the seismic data to Fourier or wavelet domains and then applies time-frequency filtering.

Another technique is described in F. Ernst et al.'s 2002 article entitled, "Reduction of near-surface scattering effects in seismic data," published in *The Leading Edge*, 17, pp. 759-764, the entire content of which is incorporated by reference. This technique derives geophysical parameters (surface wave velocity, surface wave frequency spectrum, scattered locations) from the seismic data and then uses these parameters to create a model of surface waves.

Yet another technique is described in S. Dong et al.'s 2006 article entitled, "Interferometric prediction and least-squares subtraction of surface waves," published in *76th Annual International Meeting, SEG, Expanded Abstracts*, pp. 2,783-2,786, in D. Halliday et al.'s 2010 article entitled, "Interferometric ground-roll removal: Attenuation of scattered surface waves in single-sensor data," published in *Geophysics*, 75(2), pp. SA15-SA25, and in B. Guo et al.'s 2015 article entitled, "Super-virtual Interferometric Separation and Enhancement of Back-scattered Surface Waves," presented at the 2015 SEG Annual Meeting of the Society of Exploration Geophysicists, the entire contents of which are incorporated herein by reference. This technique uses interferometry on measured surface waves to estimate surface waves of a different geometry (e.g., between receivers only).

Another technique is described in D. Halliday's 2015 article entitled, "Scattered ground-roll attenuation using model-driven interferometry," published in *Geophysical Prospecting*, 63(1), pp. 116-132, the entire content of which is incorporated by reference. This technique uses interferometry on measured surface waves and modeled surface waves to estimate surface waves.

Last but not least, C. Duguid et al.'s 2011 article, "Source-receiver interferometry for seismic wavefield construction and ground-roll removal," published in *The Leading Edge*, 30(8), pp. 838-843, the entire content of which is incorporated by reference, describes a technique that repeatedly uses interferometry on measured surface waves. For example, a first interferometry estimates direct surface waves and a second interferometry estimates back-scattered surface waves.

These conventional methods are limited in terms of input geometry, making it necessary to perform spatial interpolation or other post-processing before adaptive subtraction of the estimated surface waves from the seismic data.

There is a need for methods and systems that overcome the above-identified drawbacks and limitations of conventional methods.

SUMMARY

Methods and devices according to various embodiments produce an estimate of the surface waves based on the actual measured traces. The estimate of surface waves is then used to obtain information about a near-surface layer and/or removed from the seismic data before processing to extract structural information about the underground formation.

According to an embodiment, there is a method for estimating surface waves in seismic data. The method includes obtaining an incident dataset and a back-scattered dataset from an input dataset, generating virtual back-scattered traces from pairs of traces extracted from the incident dataset and the back-scattered dataset, respectively, stacking the virtual back-scattered surface traces corresponding to waves propagating between same two sources to obtain a stacked virtual back-scattered dataset, generating super-virtual back-scattered surface traces by correlating or convoluting pairs of traces with a common source, one trace from the stacked virtual back-scattered dataset and another from the incident or back-scattered dataset, and stacking the super-virtual back-scattered surface traces corresponding to waves propagating between same source and same receiver, to obtain an estimate of the surface waves.

According to another embodiment, there is a data processing apparatus configured to estimate surface waves in seismic data recorded with a data acquisition system over an underground formation. The apparatus has an interface configured to receive seismic data acquired over an underground formation, and a data processing unit connected to the interface. The data processing unit is configured to obtain an incident dataset and a back-scattered dataset from the seismic data, to generate virtual back-scattered traces from pairs of traces extracted from the incident dataset and the back-scattered dataset, respectively, to stack the virtual back-scattered surface traces corresponding to waves propagating between same two sources to obtain a stacked virtual back-scattered dataset, to generate super-virtual back-scattered surface traces by correlating or convoluting pairs of traces with a common source, one trace from the stacked virtual back-scattered dataset and another from the incident or back-scattered dataset, and to stack the super-virtual back-scattered surface traces corresponding to waves propagating between same source and same receiver, to obtain an estimate of the surface waves.

According to yet another embodiment, there is a non-transitory computer-readable media storing executable codes which, when executed by a processor, make the processor perform a method for estimating surface waves in seismic data recorded with a data acquisition system over an underground formation. The method includes obtaining an incident dataset and a back-scattered dataset from an input dataset, generating virtual back-scattered traces from pairs of traces extracted from the incident dataset and the back-scattered dataset, respectively, stacking the virtual back-scattered surface traces corresponding to waves propagating between same two sources to obtain a stacked virtual back-scattered dataset, generating super-virtual back-scattered surface traces by correlating or convoluting pairs of traces with a common source, one trace from the stacked virtual back-scattered dataset and another from the incident or back-scattered dataset, and stacking the super-virtual back-scattered surface traces corresponding to waves propagating between same source and same receiver, to obtain an estimate of the surface waves.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1 is a flowchart of a method according to an embodiment;

FIG. 2 is a schematic representation of obtaining a virtual back-scattered surface trace by correlating a first pair of traces;

FIG. 3 is a schematic representation of obtaining a virtual back-scattered surface trace by convoluting a second pair of traces;

FIG. 4 is a schematic representation of obtaining a super-virtual back-scattered surface trace by correlating or convoluting a stacked virtual back-scattered trace with an incident trace;

FIG. 5 is a schematic representation of obtaining a super-virtual back-scattered surface trace by correlating or convoluting a stacked virtual back-scattered trace with a back-scattered trace; and FIG. 6 is a schematic diagram of a data processing apparatus according to an embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, in the context of land seismic surveys. However, the inventive concepts to be discussed next are not limited to land seismic surveys, but may also be applied for land surveys and surveys with electromagnetic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Seismic data collected during seismic surveys is used to generate structural images of a surveyed underground formation underneath and an area on which seismic sources and seismic receivers are deployed during the survey. The receivers detect seismic waves caused by the seismic sources. The detected seismic waves include waves reflected at interfaces between layers inside the surveyed formation and surface waves traveling from a seismic source to a seismic receiver via the near-surface (top) layer only. These surface waves carry information about the near-surface layer, but may corrupt the information related to the waves reflected deeper inside the underground formation. Therefore, the surface waves are identified and removed before processing the seismic data to obtain the desired structural images. The embodiments described in this section provide an improved identification of surface waves. The efficiency of locating and subsequently exploiting hydrocarbons recovery is, therefore, improved when structural images are not altered by undesirable artifacts due to inferior removal of the surface waves.

FIG. 1 is a flowchart of a method 100 for estimating surface wave coda in seismic data recorded with a data acquisition system over an underground formation.

Some terms used to characterize this method's steps are now explained. The term "incident" means direct, and the term "back-scattered" means indirect, scattered. The term "virtual" indicates a result of interferometric estimation based on two measured data traces (i.e., means interferometrically estimated). The term "super-virtual" indicates an interferometric estimation based on one measured data trace and one virtual trace (as, for example, described in P. Bharadwaj, P. et al.'s 2011 article entitled, "Super-virtual refraction interferometry: theory," presented at SEG Annual Meeting of Society of Exploration Geophysicists, the entire content of which is incorporated by reference).

Further, an input dataset is a subset of the originally acquired seismic data, which included both surface waves and seismic waves reflected from layer interfaces inside the underground formation. In this subset (i.e., the input dataset), the surface waves are approximately isolated (for example, other waves emerging from locations deeper within the underground formation have been muted). Some pre-processing (for example, noise reduction) may also have been applied to this input dataset. Thus, the input dataset focusses on the information related to the surface waves.

Method 100's first step 110 is obtaining an incident dataset and a back-scattered dataset from the input dataset. The incident dataset is obtained by muting traces in the input dataset outside a time interval between a start time and an end time associated with a surface wave emitted by a source. The start time and the end time that can be visually assessed as illustrated in FIG. 2, where values above 210 represent the incident field dataset, and values below 210 represent to the scattered field. The start time and the end time may be frequency dependent.

"Muting" means replacing the recorded seismic amplitude values with zeroes. A geophysicist may inspect a portion of the input dataset, at several different locations and manually pick the time at which the incident fields ends and the scattered field starts. Around this time, the characteristic of the measured wave field changes. If the inspected locations are representative for the diversity of propagation conditions of the whole dataset, a generic mute law derived based on these manually picked times may provide a good separation of the surface wave.

The back-scattered dataset refers to a dataset complementary to the incident dataset, and is obtained by muting traces in the input dataset up to the separation time. A trace is a series of values recorded by a receiver in time and is often represented as a graph with time on a vertical axis, increasing downward. Therefore, the incident dataset is sometimes said to be the upper part of the input dataset, while the back-scattered dataset is the lower part of the input dataset. The back-scattered dataset represents back-scattering surface waves (scattered, propagating indirectly on a jagged path from the source to the receiver).

Method 100 then includes generating virtual back-scattered traces at 120. The virtual back-scattered traces are obtained by correlating and/or convoluting pairs of traces with a common receiver, with one trace in the pair being extracted from the incident dataset and the other from the back-scattered dataset. A virtual back-scattered dataset includes virtual back-scattered surface traces representing waves propagating between any two sources.

FIG. 2 illustrates obtaining a virtual back-scattered surface trace by correlating a first pair of traces. Box 210 frames a diagram illustrating a back-scattered trace corresponding to a wave back-scattered between source Sb and receiver Rz, box 220 frames a diagram illustrating an incident trace of a wave propagating directly between source Sa and receiver Rz, and the star between these boxes symbolizes the correlation. For example, if a trace having a spike at 2 s from a reference time is correlated with a trace having a spike at 3 s, the result is a trace with a spike at +1 s. The result of the correlation in FIG. 2 is an estimated virtual back-scattered trace illustrated by the diagram framed by box 230. The estimated virtual back-scattered trace corresponds to a wave changing direction when scattered between Sa and Sb.

FIG. 3 illustrates obtaining a virtual back-scattered surface trace by convoluting a second pair of traces. Box 310 frames a diagram illustrating a back-scattered trace of a wave back-scattered between source Sa and receiver Ry, box 320 frames a diagram illustrating an incident trace of a wave propagating directly from Sd to Ry, and the asterisk between these boxes symbolizes the convolution. For example, if a trace having a spike at 2 s is convoluted with a trace having a spike at 3 s, the result is a trace having a spike at 5 s. The result of the convolution in FIG. 3 is illustrated by the diagram framed by box 330. The first pairs which are correlated and the second pairs which are convoluted may be different (as suggested by using Sa, Sb and Rz in FIG. 2, and Sc, Sd and Ry in FIG. 3). Correlation, convolution or both may be used depending on the expected locations of the scatterers. If the scatterer is far on the source side, correlation yields the expected virtual trace, while convolution would yield non-physical artifacts. If the scatterer is far on the receiver side, convolution yields the expected virtual trace, while correlation would yield non-physical artifacts. However, in practice, since the actual scatterers locations is not known, both correlation and convolutions may be used based on the assumption that the non-physical artifacts average each other out in the sum and/or are generally weaker than the actual physical scattered energy.

However, similar convolutions and correlations are performed to generate virtual back-scattered waves between Sa and Sc, Sb and Sc, etc. (for some or all sources of the data acquisition system).

The virtual back-scattered traces may be generated only for the pairs of traces corresponding to receivers no farther than a predetermined distance from one another. Alternatively, all pairs may be calculated but only physically meaningful results may be retained. In an embodiment, processing is done separately for multiple frequency bands, and frequency-dependent maximum distances are used. In another embodiment, all possible sources/receivers are considered (or as many among the sources/receivers as computing resources allow). In yet other embodiment, one sources/receivers assumed (or estimated) to provide a significant contribution to the next sum or a contribution with a high signal-noise ratio are considered (for example, the sources/receivers are close to the assumed/estimated surface-wave ray).

Method 100 further includes stacking virtual back-scattered surface waves propagating between the same two sources to obtain a stacked virtual back-scattered dataset at 130. In one embodiment, the virtual back-scattered surface waves between sources Sa and Sb for all receivers and regardless of whether obtained by convolution or correlation are stacked. In another embodiment, the processing is split here, yielding two final outputs: one obtained using correlations, and the other obtained using convolutions. Other approaches may be implemented; for example, the convoluted virtual traces for a certain range of offsets, and the correlated traces for another range of offsets may be stacked together. The term "stacked virtual back-scattered dataset" refers to the dataset produced by stacking the virtual back-scattered waves propagating between the same sources.

At 140, method 100 includes generating super-virtual back-scattered surface traces by correlating or convoluting pairs of traces with a common source, one trace from the stacked virtual back-scattered dataset and another from the incident or back-scattered dataset.

FIG. 4 illustrates obtaining a super-virtual back-scattered surface trace by correlating or convoluting a stacked virtual back-scattered trace with an incident trace. Box 410 frames a diagram illustrating a stacked virtual back-scattered trace between sources Sa and Sb, box 420 frames a diagram illustrating an incident trace between source Sb and receiver Rz, and the star or asterisk between these boxes symbolizes the correlation or convolution. The result is a super-virtual back-scattered trace illustrated by the diagram framed by box 430.

FIG. 5 illustrates obtaining a super-virtual back-scattered surface trace by correlating or convoluting a stacked virtual back-scattered trace with a back-scattered trace. Box 510 frames a diagram illustrating a stacked virtual back-scattered trace between sources Sa and Sb, box 520 frames a diagram illustrating the back-scattered trace between Sb and Rz, and the star or asterisk between these boxes symbolizes the correlation or convolution. The result is a super-virtual back-scattered trace illustrated by the diagram framed by box 530.

Returning now to FIG. 1, method 100 finally includes stacking the super-virtual back-scattered surface waves propagating between the same source and same receiver at 150. This step produces a new dataset with super-virtual back-scattered surface waves, which is an estimate of back-scattered surface waves propagating between all sources and receivers on the input dataset. This estimate may further be enhanced, for example, with a mute to remove some artifacts.

The method may further include subtracting the estimate of the surface waves from the seismic data to obtain surface wave-attenuated seismic data, and processing the surface wave-attenuated seismic data to extract structural information related to an underground formation over which the seismic data was acquired. Alternatively or additionally, the method may further include extracting information about near-surface layer from the estimate of the surface waves.

Unlike the conventional methods, the embodiments described in this section are able to estimate surface waves for any input geometry (i.e., arrangement of sources and receivers): two-dimensional, three-dimensional, cross-spread, node acquisition, etc. The embodiments estimate the surface waves on the same geometry as the input dataset—evaluating waves propagating between the same sources and receivers. Therefore, the methods' output (i.e., the surface wave estimate) can be directly used in further processing (e.g., adaptive subtraction) without spatial interpolation or other approximations.

The embodiments compute, as an intermediary dataset, virtual back-scattered surface waves propagating between two receivers. Therefore, the final output includes energy propagating along all possible back-scattered paths. Depending on the virtual traces selected when the virtual back-scattered traces are generated (e.g., a maximum distance criterion), the back-scattering emphasized in the output may have happened near the receiver, or/and elsewhere. There is no restriction on where the back-scattering have happened in order to be included in the surface wave estimate. No part of the path has to be direct, although it is specifically chosen when generating the super-virtual back-scattered traces.

The above-discussed methods may be implemented in a computing device 600 as illustrated in FIG. 6. Hardware, firmware, software or a combination thereof may be used to perform the various steps and operations described herein.

Exemplary computing device 600 suitable for performing the methods described in this section includes a server 601 with a central processor (CPU) 602 coupled to a random access memory (RAM) 604 and to a read-only memory (ROM) 606. Memory 606 may also be other types of storage media to store programs, such as programmable ROM (PROM), erasable PROM (EPROM), etc. Processor 602 may communicate with other internal and external components through input/output (I/O) circuitry 608 and bussing 610 to provide control signals and the like. Processor 602 carries out a variety of functions as are known in the art, as dictated by software and/or firmware instructions.

Server 601 may also include one or more data storage devices, including hard drives 612, CD-ROM drives 614 and other hardware capable of reading and/or storing information, such as DVD, etc. In one embodiment, software for carrying out the above-discussed steps may be stored and distributed on a CD-ROM or DVD 616, a USB storage device 618 or other form of media capable of portably storing information. These storage media may be inserted into, and read by, devices such as CD-ROM drive 614, disk drive 612, etc. Server 601 may be coupled to a display 620, which may be any type of known display or presentation screen, such as LCD, plasma display, cathode ray tube (CRT), etc. A user input interface 622 is provided, including one or more user interface mechanisms such as a mouse, keyboard, microphone, touchpad, touch screen, voice-recognition system, etc.

Server 601 may be coupled to other devices, such as sources, detectors, etc. The server may be part of a larger network configuration as in a global area network (GAN) such as the Internet 628, which allows ultimate connection to various computing devices.

The advantage of the approach set forth above is that surface waves can be estimated for any data acquisition geometry in a two-dimensional (2D) arrangement, a three-dimensional (3D) arrangement, cross-spread, etc.

The methods according to various embodiments described in this section estimate the surface waves for the same geometry as the input dataset, i.e., the estimated surface wave dataset is related to the surface waves propagating between the same sources and receivers as the ones used to acquire the seismic data. Therefore, the output of these methods can be used directly in further processing (e.g., adaptive subtraction from the seismic data) without spatial interpolation or other approximations.

The disclosed exemplary embodiments provide methods for estimating incident and back-scattered surface waves of seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for estimating surface waves in seismic data, the method comprising:
   obtaining an incident dataset and a back-scattered dataset from an input dataset;
   generating virtual back-scattered traces from pairs of traces extracted from the incident dataset and the back-scattered dataset, respectively;
   stacking the virtual back-scattered traces corresponding to waves propagating between same two sources to obtain a stacked virtual back-scattered dataset;
   generating super-virtual back-scattered surface traces by correlating or convoluting pairs of traces with a common source, one trace from the stacked virtual back-scattered dataset and another from the incident or back-scattered dataset; and
   stacking the super-virtual back-scattered surface traces corresponding to waves propagating between same source and same receiver, to obtain an estimate of the surface waves,
   wherein the estimate of the surface waves is then used to obtain information about a near-surface layer and/or removed from the seismic data before processing to extract structural information about the underground formation.

2. The method of claim 1, wherein the input dataset is a subset of the seismic data acquired over an underground formation using a plurality of sources and receivers, the input dataset being focused on information related to the surface waves.

3. The method of claim 1, wherein the incident dataset and the back-scattered dataset include complementary trace information, so as, an incident trace muted after a surface wave separation time pertains to the incident dataset, and a back-scattered trace muted before the surface wave separation time pertains to the back-scattered dataset for a recorded trace in the input dataset.

4. The method of claim 1, wherein the virtual back-scattered traces are generated only for the pairs of traces corresponding to receivers no farther than a predetermined distance from one another.

5. The method of claim 1, wherein, when generating the virtual back-scattered traces, first pairs of traces are convoluted, and second pairs of traces different from the first pairs of traces are correlated.

6. The method of claim 1, further comprising:
subtracting the estimate of the surface waves from the seismic data to obtain surface wave-attenuated seismic data; and
processing the surface wave-attenuated seismic data to extract structural information related to an underground formation over which the seismic data was acquired.

7. The method of claim 1, further comprising:
extracting information about a near-surface layer from the estimate of the surface waves.

8. A seismic data processing apparatus configured to estimate surface waves in seismic data, the apparatus comprising:
an interface configured to receive seismic data acquired over an underground formation; and
a data processing unit connected to the interface and configured
to obtain an incident dataset and a back-scattered dataset from the seismic data,
to generate virtual back-scattered traces from pairs of traces extracted from the incident dataset and the back-scattered dataset, respectively,
to stack the virtual back-scattered surface traces corresponding to waves propagating between same two sources to obtain a stacked virtual back-scattered dataset,
to generate super-virtual back-scattered surface traces by correlating or convoluting pairs of traces with a common source, one trace from the stacked virtual back-scattered dataset and another from the incident or back-scattered dataset, and
to stack the super-virtual back-scattered surface traces corresponding to waves propagating between same source and same receiver, to obtain an estimate of the surface waves,
wherein the estimate of the surface waves is then used to obtain information about a near-surface layer and/or removed from the seismic data before processing to extract structural information about the underground formation.

9. The seismic data processing apparatus of claim 8, wherein, before obtaining the incident dataset and the back-scattered dataset, the data processing unit prepares an input dataset from the seismic data, the input dataset being focused on information related to the surface waves.

10. The seismic data processing apparatus of claim 8, wherein the incident dataset and the back-scattered dataset include complementary trace information, so as, an incident trace muted after a surface wave separation time pertains to the incident dataset, and a back-scattered trace muted before the surface wave separation time pertains to the back-scattered dataset for a recorded trace in the input dataset.

11. The seismic data processing apparatus of claim 8, wherein the data processing unit generates the virtual back-scattered traces only for the pairs of traces corresponding to receivers no farther than a predetermined distance from one another.

12. The seismic data processing apparatus of claim 8, wherein, when generating the virtual back-scattered traces, first pairs of traces are convoluted, and second pairs of traces different from the first pairs of traces are correlated.

13. The seismic data processing apparatus of claim 8, wherein the data processing unit is further configured:
to subtract the estimate of the surface waves from the seismic data to obtain surface wave-attenuated seismic data; and
to process the surface wave-attenuated seismic data to extract structural information related to the underground formation.

14. The seismic data processing apparatus of claim 8, wherein the data processing unit is further configured to extract information about a near-surface layer of the underground formation from the estimate of the surface waves.

15. A non-transitory computer readable media storing executable codes which, when executed by a processor make the processor perform a method for estimating surface waves in seismic data recorded over an underground formation, the method comprising:
obtaining an incident dataset and a back-scattered dataset from the input dataset;
generating virtual back-scattered traces from pairs of traces extracted from the incident dataset and the back-scattered dataset, respectively;
stacking the virtual back-scattered traces corresponding to waves propagating between same two sources to obtain a stacked virtual back-scattered dataset;
generating super-virtual back-scattered surface traces by correlating or convoluting pairs of traces with a common source, one trace from the stacked virtual back-scattered dataset and another from the incident or back-scattered dataset; and
stacking the super-virtual back-scattered surface traces corresponding to waves propagating between same source and same receiver, to obtain an estimate of the surface waves,
wherein the estimate of the surface waves is then used to obtain information about a near-surface layer and/or removed from the seismic data before processing to extract structural information about the underground formation.

16. The computer readable media of claim 15, wherein the input dataset is a subset of the seismic data acquired over an underground formation using a plurality of sources and receivers, the input dataset being focused on information related to the surface waves.

17. The computer readable media of claim 15, wherein the incident dataset and the back-scattered dataset include complementary trace information, so as, an incident trace muted after a surface wave separation time pertains to the incident dataset, and a back-scattered trace muted before the surface wave separation time pertains to the back-scattered dataset for a recorded trace in the input dataset.

18. The computer readable media of claim 15, wherein the virtual back-scattered traces are generated only for the pairs of traces corresponding to receivers no farther than a predetermined distance from one another.

19. The computer readable media of claim 15, wherein, when generating the virtual back-scattered traces, first pairs of traces are convoluted, and second pairs of traces different from the first pairs of traces are correlated.

20. The computer readable media of claim 15, wherein the method further comprises:
  subtracting the estimate of the surface waves from the seismic data to obtain surface wave-attenuated seismic data, and processing the surface wave-attenuated seismic data to extract structural information related to an underground formation over which the seismic data was acquired; and/or
  extracting information about a near-surface layer from the estimate of the surface waves.

\* \* \* \* \*